United States Patent [19]
Leichliter

[11] 3,856,122
[45] Dec. 24, 1974

[54] VISCOUS COUPLING

[75] Inventor: Wayne K. Leichliter, Marshall, Mich.

[73] Assignee: Eaton Corporaton, Cleveland, Ohio

[22] Filed: May 16, 1973

[21] Appl. No.: 360,629

[52] U.S. Cl............................ 192/58 B, 192/82 T
[51] Int. Cl........................................ F16d 35/00
[58] Field of Search........................ 192/58 B, 82 T

[56] References Cited
UNITED STATES PATENTS

| | | | |
|---|---|---|---|
| 3,259,221 | 7/1966 | Godfrey | 192/58 B |
| 3,272,188 | 9/1966 | Sabat | 192/58 B X |
| 3,323,623 | 6/1967 | Roper | 192/58 B |
| 3,419,122 | 12/1968 | Connelly | 192/58 B |
| 3,430,743 | 3/1969 | Fujita et al. | 192/58 B |
| 3,463,282 | 8/1969 | Fujita et al. | 192/58 B |
| 3,505,982 | 4/1970 | Walter et al. | 192/82 T |
| 3,552,532 | 1/1971 | Thomas et al. | 192/82 T X |
| 3,757,914 | 9/1973 | Elmer | 192/58 B X |

*Primary Examiner*—Allan D. Herrmann
*Attorney, Agent, or Firm*—Teagno & Toddy

[57] ABSTRACT

A coupling for driving a cooling fan device associated with a vehicle includes relatively rotatable input and output coupling members. The input coupling member defines a chamber within which the output coupling member rotates. The input and output coupling members have a plurality of interdigitated lands and grooves which define a shear space therebetween and which are cooperable with viscous shear fluid in the shear space to transmit torque therebetween. Means is provided for varying the volume of shear fluid in the shear space by providing for a flow of the fluid radially from the shear space into a fluid reservoir chamber defined by at least a portion of the input coupling member. The interdigitated lands and grooves are located ideally relative to the ram air for purposes of heat distribution and cooling fins are provided on the input coupling member which further aids heat dissipation. In addition, a means for controlling the flow of fluid from the reservoir chamber into the shear space is provided and that means includes a thermostatically controlled valve.

12 Claims, 7 Drawing Figures

VISCOUS COUPLING

BACKGROUND OF THE INVENTION

The present invention relates to drive couplings of the type embodying a fluid medium for transmitting torque between relatively rotatable input and output coupling members, and more particularly relates to a shear-type fluid coupling wherein a fluid shear medium transmits torque between relatively rotatable input and output coupling members. Fluid couplings of the type to which the present invention relates are usable for driving various different kinds of load devices, and have particular utility for driving an engine accessory, such as a cooling fan device of an internal combustion engine.

Such drive couplings for driving the cooling fans of an internal combustion engine are well known. Typically, such drive couplings include input and output members which have interdigitated portions or lands and grooves which are spaced closely adjacent each other with a fluid shear medium positioned in the space therebetween. The fluid shear medium functions to transmit torque from the input member to the output member which is drivingly connected with the fan device. The advantages of using a viscous shear drive for driving a fan device are well known. The transmission of drive between the input and output coupling members through the viscous shear fluid generates heat. The dissipation of that heat is important for the provision of an efficient and high capacity torque-transmitting unit.

Known efforts at providing for higher heat dissipation have involved the location of the drive-transmitting grooves and shear space ideally with respect to the ram air stream. Specifically, the location of the drive grooves in the front of the unit so that the area of torque transmission is directly located in the ram air stream is ideal. Also, any cooling fins on the coupling are located directly in the ram air stream. Such a design is disclosed in Clancey application Ser. No. 305,376, assigned to the assignee of the present invention.

It has also been recognized that the location of the cooling fins on the input member of the coupling provides for rotation of the cooling fins at a higher speed than if the cooling fins were located on the output member. Typical examples of viscous shear couplings where the cooling fins are located on the input coupling member are shown in Sabat U.S. Pat. No. 3,272,188 and Sutaruk U.S. Pat. No. 3,445,707, both of which are assigned to the assignee of the present invention.

Not only has it been recognized that it is desirable to locate for purposes of heat dissipation the shear space ideally with respect to the ram air stream and the cooling fins on the input member, but it has also been recognized in the viscous coupling art that it is desirable to provide a mechanism for varying the volume of shear fluid in the shear space. Of course, the greater the volume of fluid in the shear space, the greater the torque transmission, and by reducing the volume of fluid in the shear space, a reduction in torque transmission is accomplished. It is desirable, of course, to provide such in order to control the torque transmission between the input and output coupling members. Certain viscous couplings utilized for operating or driving a fan device include a temperature-sensing device for sensing the ambient temperature and which controls the volume of shear fluid in the shear space. A typical example of such is shown in U.S. Pat. Nos. 3,055,473 and 3,263,783.

SUMMARY OF THE PRESENT INVENTION

The present invention is directed to an improved viscous coupling having input and output coupling members which define a shear space therebetween and by which viscous fluid in the shear space transmits torque from the input coupling member to the output coupling member. The viscous coupling of the present invention takes advantage of the high heat dissipation capability which is achieved by locating the viscous shear space in the forward portion of the viscous coupling so as to be ideally located with respect to the ambient atmosphere and particularly the ram air stream when used in a vehicle for driving the cooling fan of the vehicle. Moreover, the viscous coupling of the present invention also has the input member as the outer housing member of the viscous coupling so as to take advantage of the fact that the cooling fins which are carried thereby are rotating at input speed and thereby generate a greater blower action through the fins than if the cooling fins are mounted on the output coupling member as is the more conventional design, Furthermore, the present invention provides a means of controlling the viscous shear fluid in the shear space and that means which effects that control includes a thermostatically controlled valve unit which responds to a sensing of ambient temperature.

DESCRIPTION OF THE DRAWINGS

Further objects, features and advantages of the present invention will be apparent to those skilled in the art to which it relates from the following detailed description thereof made with reference to the accompanying drawings in which.

DESCRIPTION OF THE PREFERRED EMBODIMENT

Figure 1:
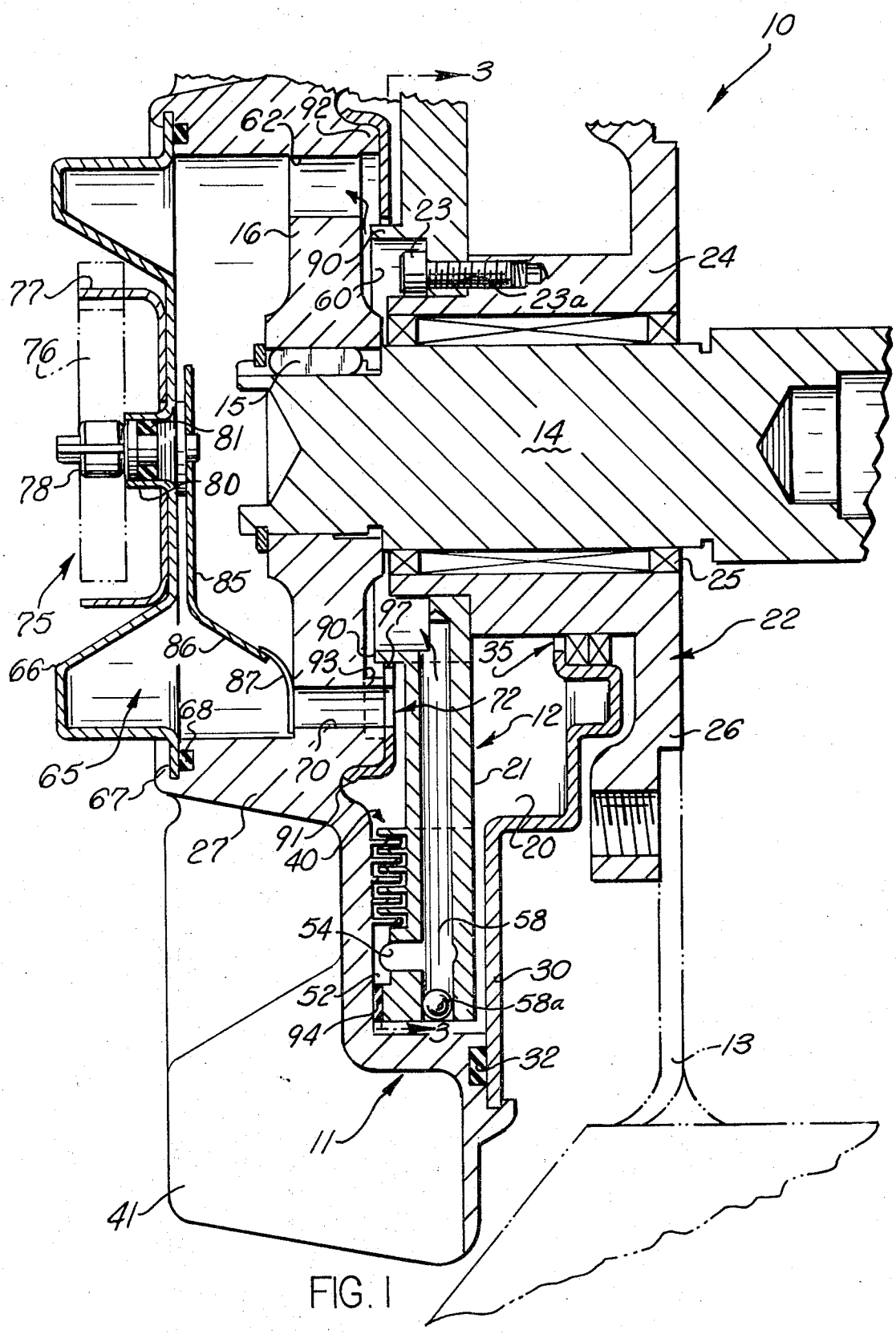
FIG. 1 is a partial, fragmentary sectional view of a viscous coupling embodying the present invention.

As noted above, the present invention provides an improved viscous fluid drive coupling in which a viscous shear fluid transmits torque between input and output coupling members. The viscous coupling of the present invention may be utilized for driving a variety of different types of load devices and is ideally suited for the driving of a fan device for an internal combustion engine and is illustrated in the drawings for such use.

The viscous coupling embodying the present invention is illustrated in FIG. 1 and is designated 10. The viscous coupling 10 includes an input coupling member 11 and an output coupling member 12. The output coupling member 12 carries fan blades 13 which are driven thereby. The fan blades 13 are utilized for the purpose of providing a cooling air stream for cooling of an internal combustion engine with which the viscous coupling 10 is associated.

The input coupling member 11 is driven from an input drive shaft 14 which may be suitably driven as by a fan belt in the vehicle. At the forward end of the shaft 14 the input coupling member is suitably keyed thereto by a key 15. Specifically, the key 15 is connected to a web portion 16 of the input coupling member and which web portion 16 extends radially of the shaft 14. The input coupling member 11 defines a chamber 20 in which the output coupling member 12, or at least a portion thereof, is located.

The output coupling member 12 has a radially extending main portion 21 which is located in the chamber 20. The portion 21 at its I.D. is suitably secured to an L-shaped member 22 by a plurality of screws 23 which extend through openings 23a. The L-shaped member 22 has an axially extending portion 24 which extends axially of the shaft 14 and a suitable bearing means 24 is interposed between the portion 24 and the shaft 14 so as to enable relative rotation between the shaft 14 and the output coupling member 12 to occur. Extending from the end of the L-shaped bracket member 22 and located outside the chamber 20 is a leg portion 26 of the L-shaped bracket 22. The fan blades 13 are suitably secured by suitable fasteners (not shown) to the leg portion 26.

The input coupling member 11 includes a main body portion 27 which is a cast piece and which includes the web portions 16 which are keyed to the shaft 14. The input coupling member also includes a portion or plate member 30 which is suitably secured as by rolling over a portion of the main body portion 27 around its outer periphery. A gasket 32 is interposed between the plate portion 30 and the main body portion 27 of the input coupling member. The plate portion 30 extends between the radially extending portion 21 of the input coupling member 12 and the radially extending leg 26 of the input coupling member, and a suitable seal means 35 is interposed between the member 30 and the outer diameter of the axially extending portion 24 of the output coupling member.

The input and output coupling members 11 and 12 are provided with interdigitated lands and grooves which are generally designated 40. The interdigitated lands and grooves define a viscous shear space therebetween and viscous shear fluid located in that shear space provides for and effects the transmission of torque from the input coupling member 11 to the output coupling member 12, as is well known.

From the above, it should be apparent that upon rotation of the shaft 14, the input coupling member 11 will be rotated and the bearing 35 will provide for rotation of the input coupling member 11 relative to the output coupling member 12. In addition, it should be apparent that the output coupling member 12 will be rotated due to the action of any viscous shear fluid in the shear space defined between the interdigitated lands and grooves 40 on the input and output coupling members. Upon rotation of the output coupling member, the output coupling member will rotate relative to the shaft 14 and relative to the input coupling member 11 and effect a drive of the fan blades 13 connected to the input coupling member.

It should also be apparent from the above that the interdigitated lands and grooves 40 are provided on the forward face of the output coupling member and are located so as to be directly within the ram air stream of the vehicle. This provides for an efficient heat dissipation due to the location of the viscous shear space and the interdigitated lands and grooves on the forward portion of the viscous coupling. In addition, it should be apparent that the input coupling member 11 is provided with a plurality of fins generally designated 41 and that the fins 41 are located on the forward face of the input coupling member 11. This further provides for effective heat dissipation. Moreover, the fins 41 are located on the input coupling member 11 and thereby rotate at a speed which is higher than the speed at which they would rotate if they were mounted on the output coupling member 12. As a result, the fins generate a greater blower action due to their mounting on the input coupling member 11 and thus provide a greater quantity of heat dissipation than if the fins were mounted on the output coupling member 12. Accordingly, it should be apparent that the viscous coupling 10 is constructed so as to provide for extremely effective heat dissipation.

Figure 2:
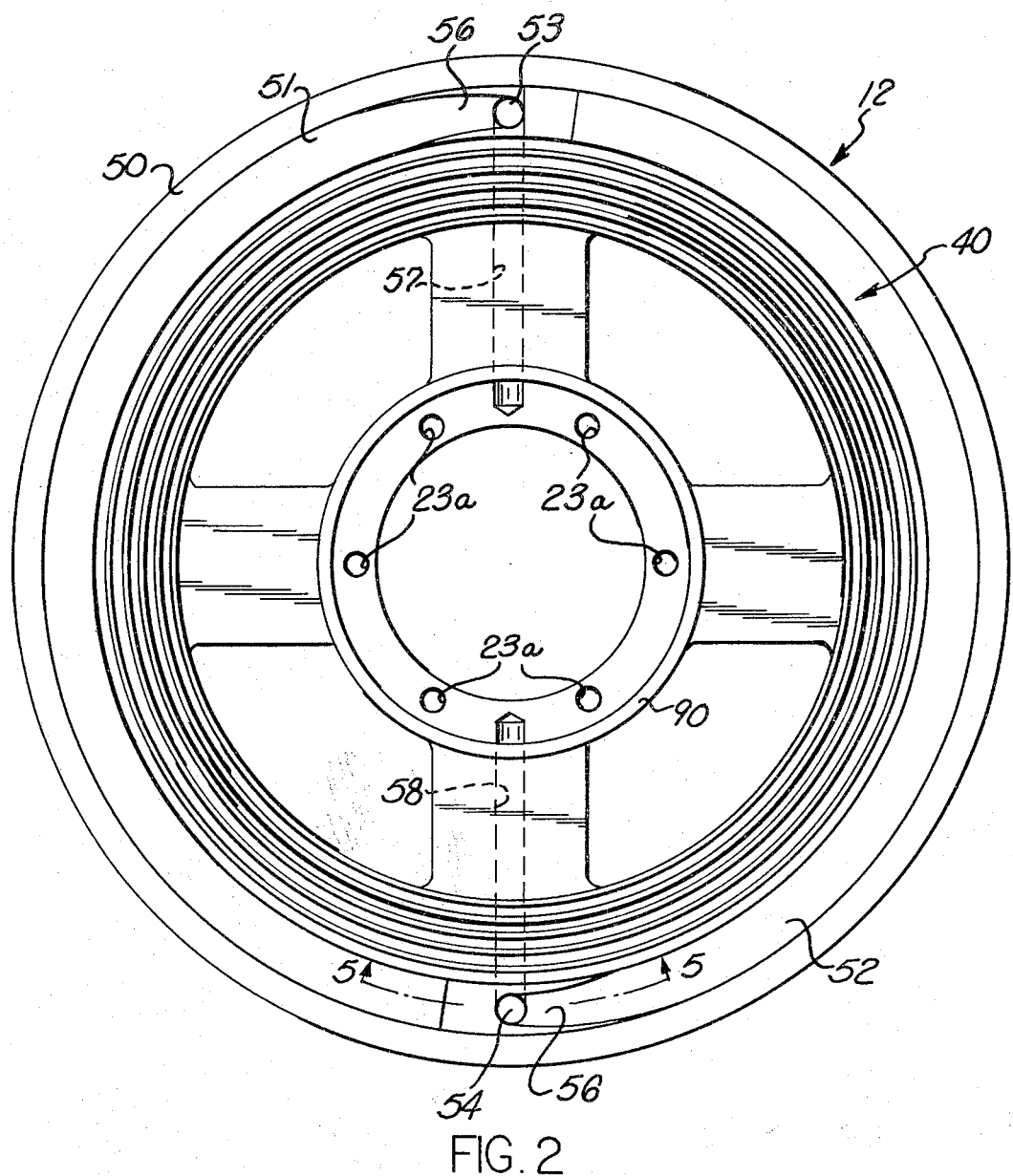
FIG. 2 is a view of one face of the output member of the viscous coupling embodied in FIG. 1.

In addition, the viscous coupling 10 is constructed to vary the volume of shear fluid in the shear space defined between the interdigitated lands and grooves 40. To this end, the viscous shear fluid is pumped from the shear space 40 by the action of portions of the viscous coupling. This pumping action occurs due to the fact that as the input coupling member 11 rotates, it drags fluid circumferentially with it around the face 50, see FIG. 2, of the output coupling member 12. The face 50 of the output coupling member 12 is provided with a pair of channels 51 and 52 which extend arcuately therearound. The channel 51 terminates at an axial opening or passageway 53 and the channel 52 terminates at an axial opening or passage 54.

Figure 5:
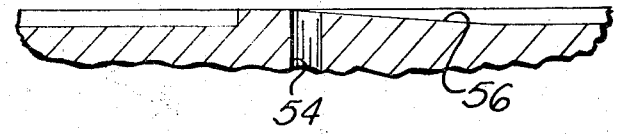
FIG. 5 is a sectional view taken approximately along line 5—5 of FIG. 2.

As the fluid is dragged around the channels 51 and 52 by rotation of the input coupling member relative to the output coupling member 12, an increase in pressure in the area adjacent the passages 53 and 54 is provided. This increase in pressure is enhanced by the tapered surface portion 56 which is adjacent each of the passages 53 and 54, and best shown in FIG. 5. The surface 56 may be considered as an impact pumping element against which fluid is impacted to create a pressure increase. This increase in pressure adjacent the passages 53, 54 provides for or causes the flow of fluid axially of the coupling member through the passages 53, 54 into radially extending passageways 57, 58, respectively. The passages 57, 58 are sealed at their outer ends, such as by a plug member 58a in FIG. 1.

The fluid which flows through the axially extending passages 53, 54 and then flows radially through the passageways 57, 58, respectively eventually leaves the passageways 57 and 58 adajcent the internal diameter of the output coupling member portion 21 and into the area of the fluid coupling designated 60 in FIG. 1. The fluid flows from the area 60 radially outwardly therefrom and into axially extending passageways 61, 62 (See FIG. 3) in the web portion 16 of the input coupling member 11. The fluid that flows through the passageways 61 and 62 is received in a reservoir chamber generally designated 65 and which is on the input coupling member 11.

The reservoir chamber 65 is defined by a portion of the input coupling member 11 and by a cover member 66 which is suitably secured to the main body 27 of the input coupling member 11 by a turned-over portion 67 thereof. A gasket member 68 is interposed between the cover member 66 and the body 27 to prevent fluid leakage therebetween.

From the above, it should be apparent that fluid is pumped from the viscous shear space and that if no fluid is directed into the shear space defned by the interdigitated lands and grooves 40 effectively, all of the fluid or at least a substantial portion of the fluid would be pumped therefrom. As a result, a minimum amount, if any, of torque would be transmitted between the input coupling member 11 and the output coupling member 12. The fluid coupling device of the present invention is provided, however, with a means for effecting the flow of fluid back into the shear space 40 to increase the volume of fluid shear medium in the shear if such is desired. The construction is such that the flow rate of fluid into the shear space may equal the flow rate of fluid out of the shear space and as a result there is no net change in the amount of fluid in the shear space. However, the flow of fluid into the shear space may be such that there is either a net reduction or a net increase in the volume of shear fluid in the shear space.

The flow of fluid from the reservoir chamber 65 into the shear space 40 is through a pair of passages 70, 71 in the input coupling member 11. The fluid that flows through the passages 70, 71 is received in chamber 20 in an area generally designated 72. The fluid that is received in the area 72 is thrown radially outwardly by centrifugal force into the shear space defined by the lands and grooves 40.

In order to control the flow of fluid through the openings 70, 71, a suitable temperature-sensing valve unit is provided and which is generally designated 75. The valve unit includes a temperature-sensing bimetallic, helically wound coil spring member 76 which is supported on the cover member 66. The temperature-sensing bimetallic spring 76 is of conventional construction and has one end thereof secured to a bracket member 77 which in turn is secured to the cover member 66. The other end of the temperature-sensing bimetallic helically wound coil spring 76 is secured to a stubshaft member 78. The stubshaft member 78 extends through an axially extending portion 80 of the cover member and into the reservoir chamber 65. A suitable seal 81 is interposed between the stubshaft member 78 and the portion 80 of the cover member 66. Upon a sensing of a change in the ambient temperature, the temperature-sensing bimetallic spring 76 will either expand or contract radially causing a rotation of the stubshaft 78 in one direction or another.

Located interiorly on the inner end of the stubshaft member and in the chamber 65 is a valve member 85. The valve member 85 extends in opposite directions from the stubshaft 78 and diametrically toward the openings 70, 71 in the input coupling member 11. The construction of the valve member 85 and its association with the opening 70 is best shown in FIG. 1 and it includes a support portion 86, and on the outer end of the support portion 86 is a valve portion in the form of a springlike valve element 87. The element 87 is associated with the passageway 70. A similar valve element is associated with the passageway 71, and not shown in FIG. 1.

Figure 3:
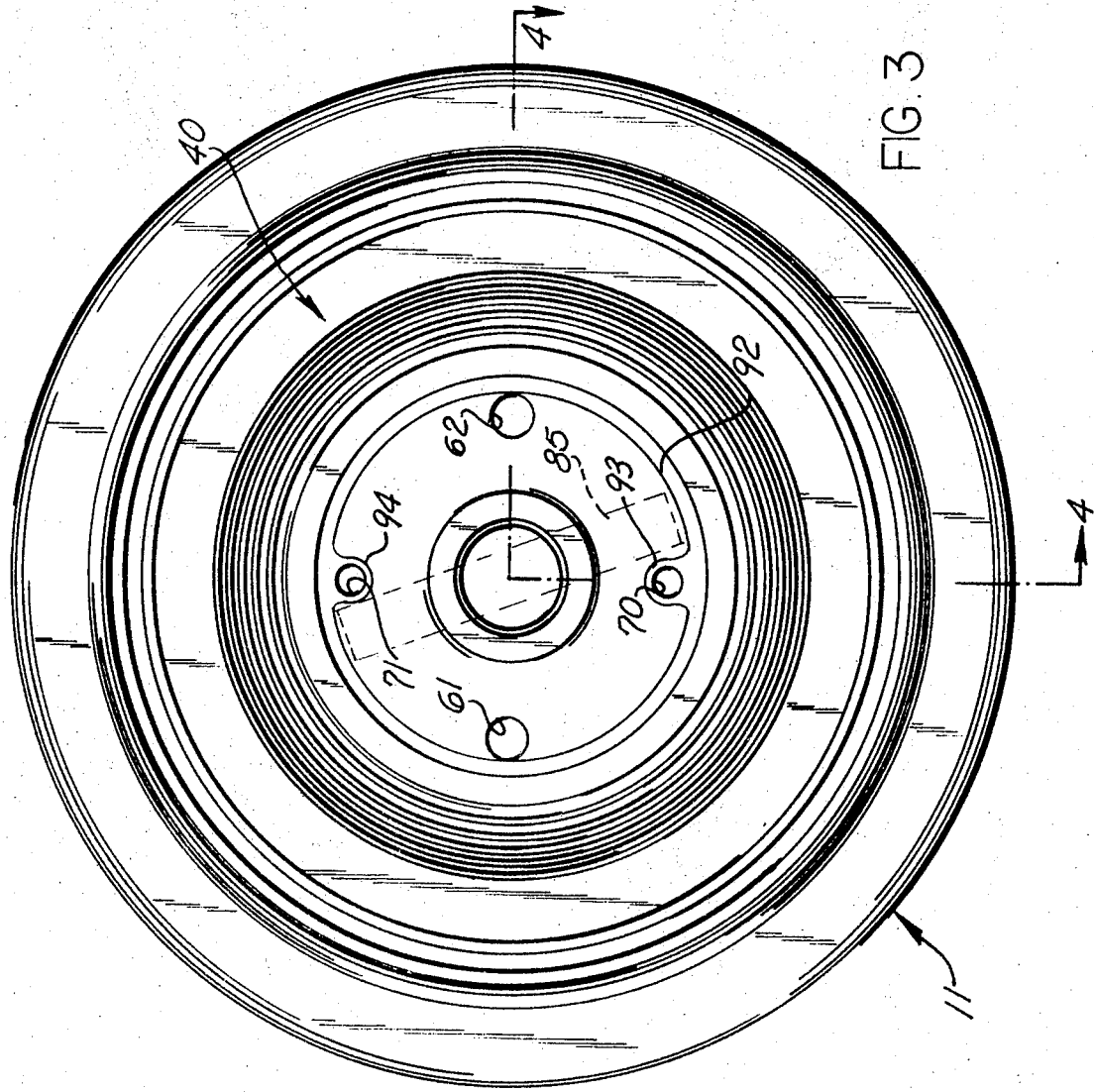
FIG. 3 is a view of a face of the input coupling member taken approximately along line 3—3 of FIG. 1.
Figure 4:
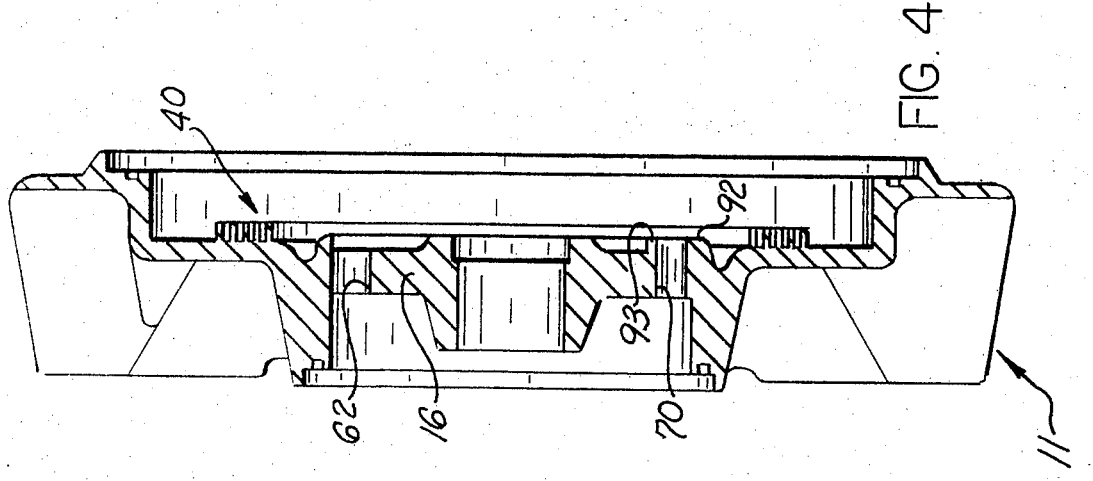
FIG. 4 is a sectional view of a portion of the input coupling member taken approximately along the line 4—4 of FIG. 3.

The valve member 85 and valve elements 87 are shown in dotted phantom schematic position in FIG. 3. As there shown, the passages 70, 71 are fully open, but it should be apparent that those passages may be fully or partially closed by rotation of the valve member 85, which rotation does occur upon sensing of a change in temperature by the temperature-sensing spring 75. If the valve member 85 is positioned so that the passages 70, 71 are blocked thereby, then no fluid is transmitted from the reservoir chamber 65 into the shear space 40. As a result, there is a net decrease in fluid in the shear space 40. If, however, the valve member 85 is positioned so that the passages 70, 71 are fully open, then fluid does flow from the reservoir chamber 65 and into the shear space 40, as noted above, and there is a net gain in the volume of shear fluid in the shear space. Of course, in intermediate positions of the valve member, an intermediate flow condition may be established in which there is a slight gain in fluid in the shear space or a slight decrease in fluid in the shear space, or no change in the volume of shear fluid in the shear space.

In order to assist in directing the flow of fluid in the manner described hereinabove, the output member 21 has on its internal diameter a lip portion 90. The lip portion 90 extends axially from the member 21 and is located radially outwardly of the area 60 to which the fluid is directed from the passageways 58 and 57.

Also, the input coupling member is provided with a cap member 91. The cap member 91 is supported on a boss 92 which extends circumferentially of the input coupling member 11 and which has at diametrically opposite locations projecting boss portions 93 and 94, all of which are best shown in FIG. 3. The passages 70, 71 are located in the projecting boss portions 93 and 94. The cap member 91 also has a portion which engages or covers those boss portions 93 and 94. Also, the cap portion projects, as best shown in FIG. 1, radially inwardly of the boss portion 93, as designated 97 in FIG. 1.

As a result of this construction, the fluid which is directed through the radial passageways 57 and 58 into the area 60 is thrown radially outwardly around the lip 90 and into and adjacent the area of the passages 61, 62. That fluid is substantially blocked from flow radially outwardly and into the area 72 adjacent the passages 70, 71 due to the projecting portion 97 of the cap member 91 and the lip 90. Likewise, when the fluid is directed through the passages 70, 71 into the area 72, the fluid will flow radially outwardly and the projecting portion 97 as well as lip 90 will cooperate to prevent or minimize any flow of fluid radially inwardly therebetween.

Interposed between the outer periphery of the output coupling member 12 and the input coupling member 11 is a friction liner 94. The friction liner serves two purposes. It functions first as a thrust face which is used to transmit the fan thrust from the output member 12 to the input member 11. Such a thrust surface is necessary since roller bearing 25 does not restrict the output member 12 from movement axially against the input member. Second, the liner 94 is used to develop a predictable torque level when the viscous shear fluid is pumped out of the shear space 40. Since the liner 94 is located outwardly of the fluid pump passages 54 and 53, the viscous shear fluid cannot be evacuated from the space. The reaction of the fan thrust load on the thin fluid film which is provided between the liner 94 and the input member 12 produces a consistent controllable torque output.

Figure 6:
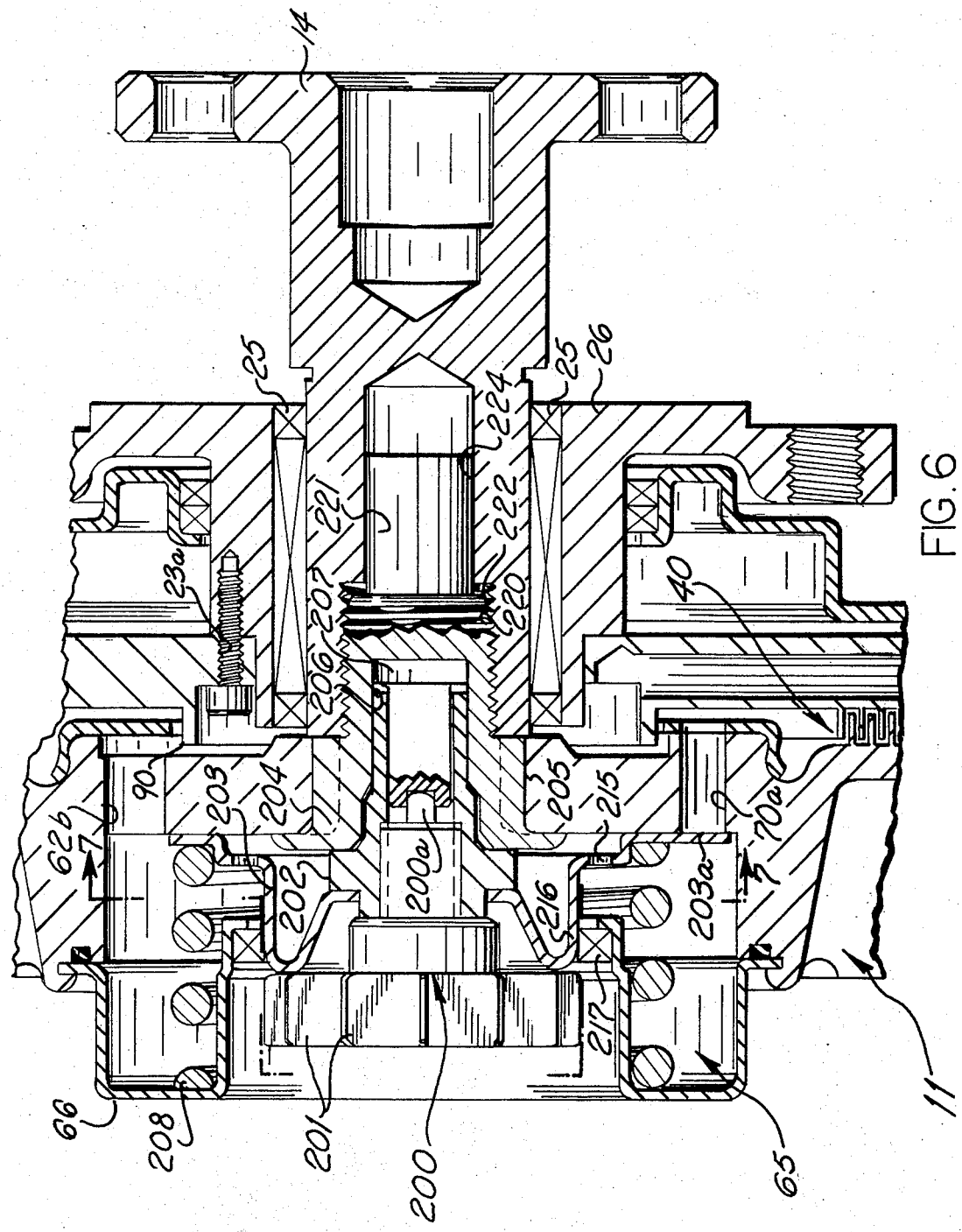
FIG. 6 is a fragmentary sectional view of a modified embodiment of the present invention.
Figure 7:
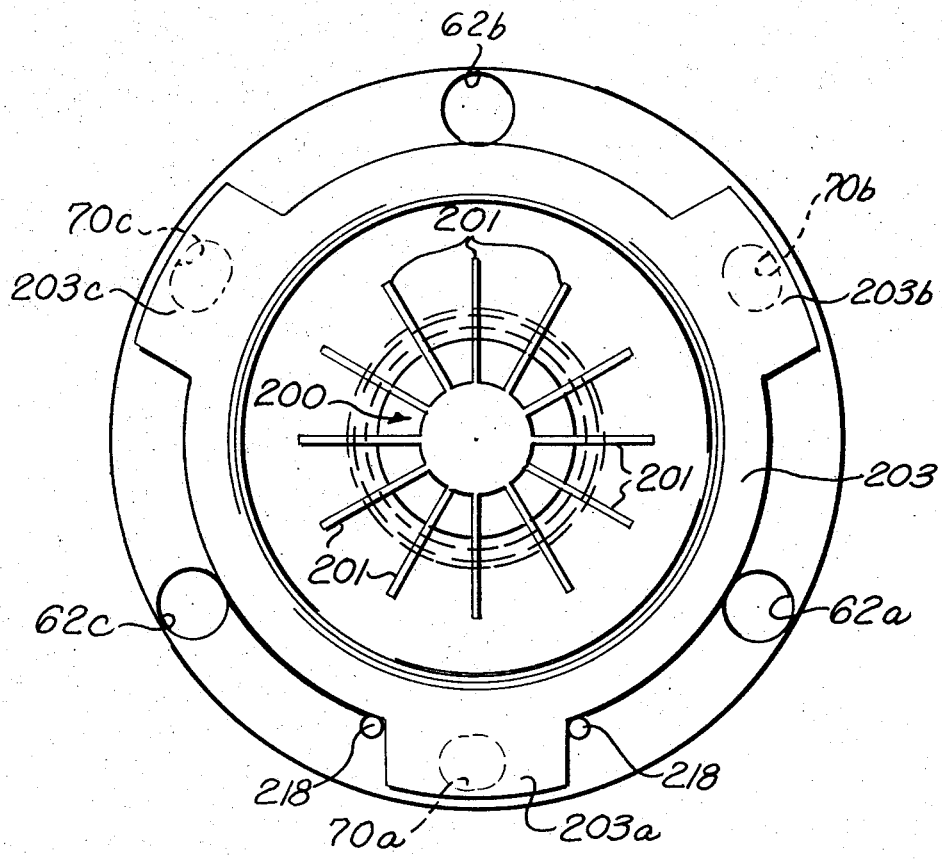
FIG. 7 is a sectional view taken along line 7—7 of FIG. 6.

FIGS. 6 and 7 illustrate a modified embodiment of the present invention which in general is similar in construction and operation to the embodiment shown in FIG. 1 and corresponding parts are given identical reference numerals. The basic difference between the two embodiments is in the temperature-sensing arrangement and the particular type of valve construction.

In the embodiment shown in FIGS. 6 and 7, the temperature-sensing element is a wax expansion-type power element, generally designated 200. The element 200 is mounted on the input member 11 and rotates therewith and a plurality of fins 201 are on the power element for purposes of heat dissipation. The fins 201 limit the effects of internal clutch heat on the power element 200 so as to cause the power element 200 to respond more closely to external clutch ambient temperature.

The power element 200 is connected with a central shaft portion 202 which has a portion interposed between a disc-like plate member 203 and the outer end of a shaft 204. The shaft 204 is suitably splined to the input member at 205 to effect drive thereto. The shaft 204 is formed with an internal passage 206 therein and a stubshaft member 207 is bottomed in the passage 206. The outer end of the shaft member 207 bears against a bottom portion 200a of the expansion-type power element 200.

When the element 200 senses an increase in temperature, the element expands axailly toward the left, as viewed in FIG. 6, and as a result the member 202 moves to the left, and forces the plate disc member 203 toward the left against the bias of a spring 208. The spring 208 acts against the cover member 66 and returns the member 203 to its initial position, as shown in FIG. 6, when the temperature sensing element 200 senses a reduction in temperature.

The member 203 includes a plurality of projecting portions 203a, 203b, and 203c which comprise valve members for opening and closing passageways 70a, 70b, and 70c, respectively. When the portions 203a, 203b, and 203c move to the left due to the sensing of an increase in temperature by the expansion element 200, the passageways 70a, 70b, and 70c are opened to enable fluid to flow from the reservoir chamber 65 into the passages 70a, 70b, and 70c and from the passages into the shear space 40, as in the embodiment described in detail in FIG. 1. Of course, when the portions 203a, 203i b, and 203c are in 203 closed positions, no fluid can flow through the passageways 70a, 70b, and 70c and into the shear space 40.

As best shown in FIG. 7, each of the projecting portions 203a, 203b, and 203c projects radially outwardly of the main periphery of the member 203. Also, as should be apparent from FIG. 7, a plurality, namely, three passages are formed in the input member and are designated 62a, 62b, and 62c for effecting fluid flow from the shear space into the reservoir chamber 65. In addition, it should be apparent that the disc member 203, as best shown in FIG. 6, has a plurality of openings therein which are designated 215 and which provide for flow of fluid between the opposite sides of the disc 203. Also the disc member 203 has an axially extending portion 216 which is received in and cooperates with a seal 217 which is interposed between the cover 66 and the axially extending portion 216 of the disc member 203. The seal 217, of course, permits axial movement of the disc member 203, as described above for purposes of providing fluid flow therethrough. Also, suitable pins, such as 218, 219, may be utilized for purposes of guiding the axial movement of the disc member and preventing rotation of the disc member 203 as it moves axially.

From the description hereinabove, it should be understood that the shaft member 204 is connected with the input coupling member 11, and the shaft member 204 is provided with a threaded portion 220 and a pilot portion 221. The threaded portion 220 is threaded into an outer peripheral end 222 of the input shaft 14, while the pilot portion 221 is slip-fit into an internal pilot portion 224 of the shaft 14. The threading, of course, is opposite from the direction of engine rotation so that on engine rotation the threads do not tend to become loosened. As a result, the viscous coupling can be readily mounted on the shaft 14 by merely threading the threaded portion of the shaft 204 into the threaded portions of the shaft 14. Moreover, and alternatively, the viscous coupling construction can be screwed directly onto a drilled and tapped water pump shaft. In the latter case, the bearing 25 would be constructed so as to run directly on the water pump shaft and this sort of construction would eliminate the need for a flange mount as shown in the drawings.

From the above, it should be apparent that applicant has provided a new and improved invention in a viscous coupling and which may be embodied in different viscous coupling structures.

In view of the above, it should be apparent that applicant has provided a highly improved viscous coupling in which the advantages of mounting the viscous shear drive on the forward portion of the coupling are effected as well as the mounting of cooling fins on the input coupling member, both of which provide for effective and substantial heat dissipation. In addition, the fluid coupling is provided with a temperature-sensing bimetallic valve unit in order to control the volume of fluid in the shear space defined between the input and output coupling members.

What is claimed is:

1. A viscous coupling comprising relatively rotatable input and output coupling members,
   said input coupling member defining a chamber in which at least a portion of said output coupling member is located,
   said input and output coupling members defining a shear space therebetween and viscous shear fluid in said shear space effecting the transmission of torque therebetween,
   means on said input member defining a fluid reservoir chamber,
   an impact pumping element carried by said output member and against which fluid is impacted by rotation of said input member,
   means defining a fluid passageway for directing fluid from adjacent said pumping element into said reservoir chamber,
   passage means for directing fluid from said reservoir chamber back into said shear space,
   valve means for controlling fluid flow through said passage means, and ambient temperature-sensing means carried by said input member on an outer surface portion thereof for controlling said valve means.

2. A viscous coupling as defined in claim 1 wherein said passageway for directing fluid from adjacent said pumping element into said reservoir chamber includes radially extending passages in said output coupling member and axially extending passages in said input coupling member and which are in fluid communication with said reservoir chamber and said radially extending passages.

3. A viscous coupling as defined in claim 1 wherein said passage means for directing fluid from said reservoir chamber includes axially extending passages in said input coupling member.

4. A viscous coupling as defined in claim 1 wherein said ambient temperature-sensing means is located on a forward portion of said input coupling member, said shear space being located forwardly of said output coupling member, and heat-dissipating fins located on said input coupling member.

5. A viscous coupling as defined in claim 1 wherein said ambient temperature-sensing means comprises a helically wound bimetallic element, a stubshaft connected with said element and rotatably thereby upon a change in temperature sensed by said bimetallic element, and means connecting said valve means with said stubshaft for rotation therewith.

6. A viscous coupling as defined in claim 1 wherein said ambient temperature-sensing means comprises an axially expandable and contractible element and means interconnecting said element and said valve member for moving said valve member axially upon a change in temperature sensed by said element.

7. A viscous coupling as defined in claim 6 further including a drive shaft member secured to said input member and having a threaded outer end adapted to be threadedly connected to a drive shaft for the coupling.

8. A viscous coupling as defined in claim 6 wherein said valve member comprises a portion of a disclike member which moves axially in one direction upon expansion of said element and spring means biasing said disc-like member in the opposite direction and effecting such movement thereof upon contraction of said element.

9. A viscous coupling comprising relatively rotatable input and output coupling members,
said input coupling member defining a chamber in which at least a portion of said output coupling member is located,
said input and output coupling members defining a shear space therebetween and viscous shear fluid in said shear space effecting the transmission of torque therebetween,
means on said input member defining a fluid reservoir chamber,
an impact pumping element carried by said output member and against which fluid is impacted by rotation of said input member,
means defining a fluid passageway for directing fluid from adjacent said pumping element into said reservoir chamber,
passage means for directing fluid from said reservoir chamber back into said shear space, said passage means including axially extending passages in said input coupling member, said axially extending passages being located in a projecting boss portion of said input coupling member, and a cap member being received on said boss portion, said cap member having a radially extending projection and said output member having an axially extending lip which together restrict flow of fluid therebetween, valve means for controlling the fluid flow through said passage means, and
ambient temperature-sensing means carried by said input member on an outer surface portion thereof for controlling said valve means.

10. A viscous coupling comprising relatively rotatable input and output coupling members,
said input coupling member defining a chamber in which at least a portion of said output coupling member is located,
said input member defining a reservoir chamber for said fluid and second passage means in said input member for directing fluid axially from said first location into said reservoir chamber,
said input member further including third passage means for directing fluid therefrom for flow into said shear space,
said input and output coupling members defining a shear space therebetween for viscous shear fluid which effects the transmission of torque therebetween,
means for varying the volume of viscous shear fluid in said shear space comprising an impact surface on said output coupling member and against which fluid adjacent said shear space is impacted to create an area of increased pressure adjacent thereto and first passage means in said output member for directing fluid from said area radially inwardly to a first location,
said third passage means being located in a projecting boss portion of said input coupling member, and a cap member being received on said boss portion, said cap member having a radially extending projection and said output member having an axially projecting lip which together restrict flow of fluid therebetween, said first location being radially inwardly of said projecting lip and said third passage means being located radially outwardly thereof, and
ambient temperature-sensing means for controlling said means for varying the volume of viscous shear fluid.

11. A viscous coupling as defined in claim 10 wherein said means for varying the volume of shear fluid further includes a valve member for controlling fluid flow from said reservoir chamber through said third passage means, and said ambient temperature-sensing means comrises a temperature-sensing member for effecting movement of said valve member upon sensing a change in temperature, and means supporting said temperature-sensing member on the exterior of said input coupling member.

12. A viscous coupling as defined in claim 10 wherein said ambient temperature-sensing means is located on a forward portion of said input coupling member, said shear space being located forwardly of said output coupling member, and heat-dissipating fins located on said input coupling member.

* * * * *